INVENTORS
Allan Asbury and
Joseph G. H. Banks.

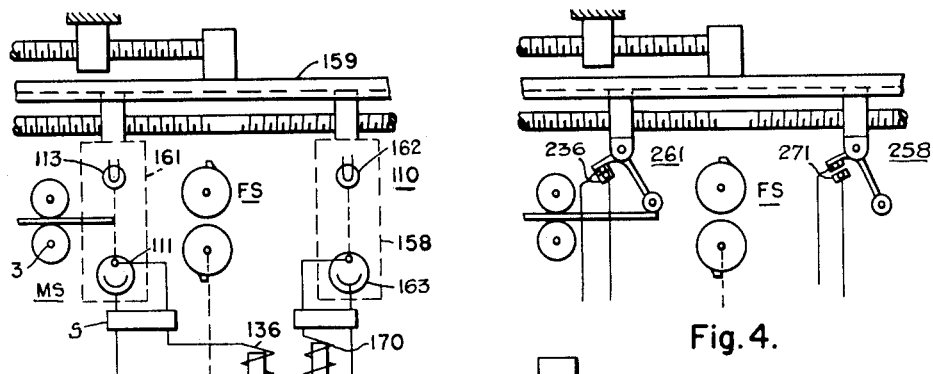
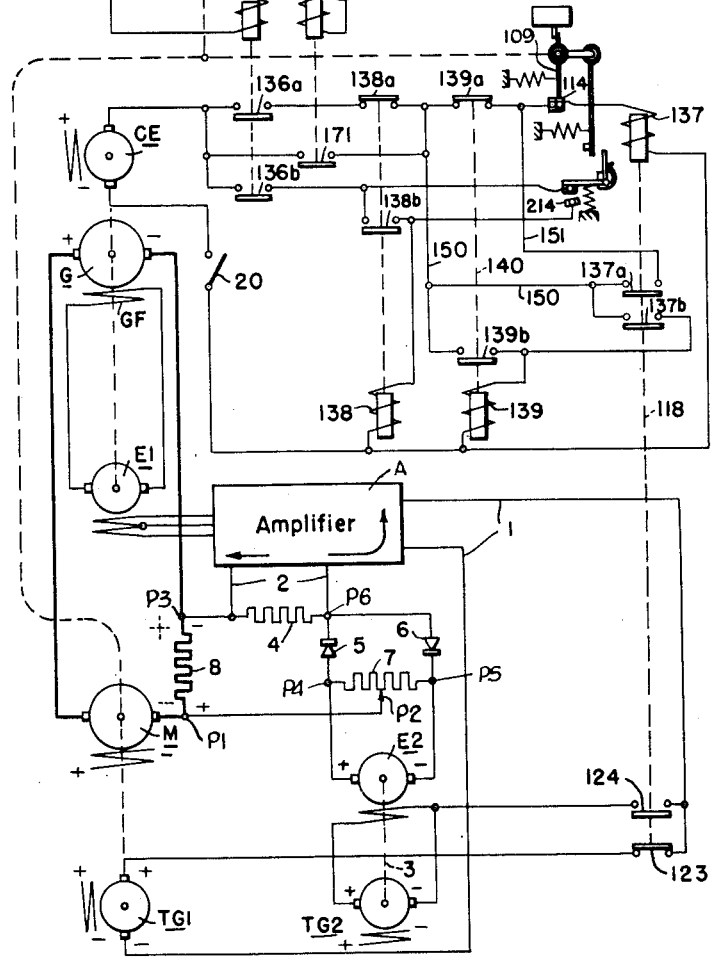
Fig. 4.
Fig. 3.

Patented Oct. 19, 1954

2,692,361

UNITED STATES PATENT OFFICE 2,692,361

CONTROL FOR MOTOR OPERATING FLYING SHEARS

Allan Asbury and Joseph Gordon Harvey Banks, Stafford, England, assignors to The English Electric Company Limited, London, England, a British company Application May 22, 1951, Serial No. 227,556

Claims priority, application Great Britain May 24, 1950

13 Claims. (Cl. 318—142)

Our invention relates to electric control systems for motors and more particularly to systems of control for direct current motors coupled to operate flying shears of a billet rolling mill.

In rolling mills of this type the billets cut may be as much as nine inches thick. Despite such thickness, the requirements are that the flying shear be so controlled that its speed in the direction of billet movement be maintained in synchronism with the billet speed during the whole of the cutting period if the cut is to be square with reference to the longitudinal axis of the billet.

It is usually also a requirement that the operator be able, at will, to vary the range of the cutting length. Means must thus be provided for allowing different lengths of billet to pass through the flying shear between the meeting edges of the shear knives.

One broad object of our invention is to provide an electric system of control for electric apparatus operating a flying shear so that the cuts are made square to the longitudinal axis of the billet.

It is also an object of our invention to, at will, alter the length of the pieces cut from a billet by appropriate control for the electric apparatus operating a flying shear.

According to one feature of our invention, the electric motor and other apparatus utilized in operating a flying shear, are controlled according to a predetermined sequence which comprises accelerating the flying shear from a predetermined position of rest to synchronous speed at a rate dependent on the square of the billet speed, maintaining this synchronous speed during the entire cutting period, decelerating the flying shear back to the predetermined rest position, and finally initiating reacceleration of the flying shear after a predetermined length of billet has passed through the shear, this sequence then being repeated for each succeeding cut. By "synchronous speed," in the preceding sentence, we mean the speed of the cutting knives in the direction of the linear speed of the billet.

The objects stated are merely illustrative of the objects of our invention. Other objects will become more apparent from a study of the following specification and the accompanying drawing, in which:

Fig. 3 shows diagrammatically a modification of our invention as utilized for the control of a motor operating a flying shear; and Fig. 4 shows somewhat diagrammatically some details of a modified version of the billet length measuring means that may be made part of our system of control.

Figure 1:
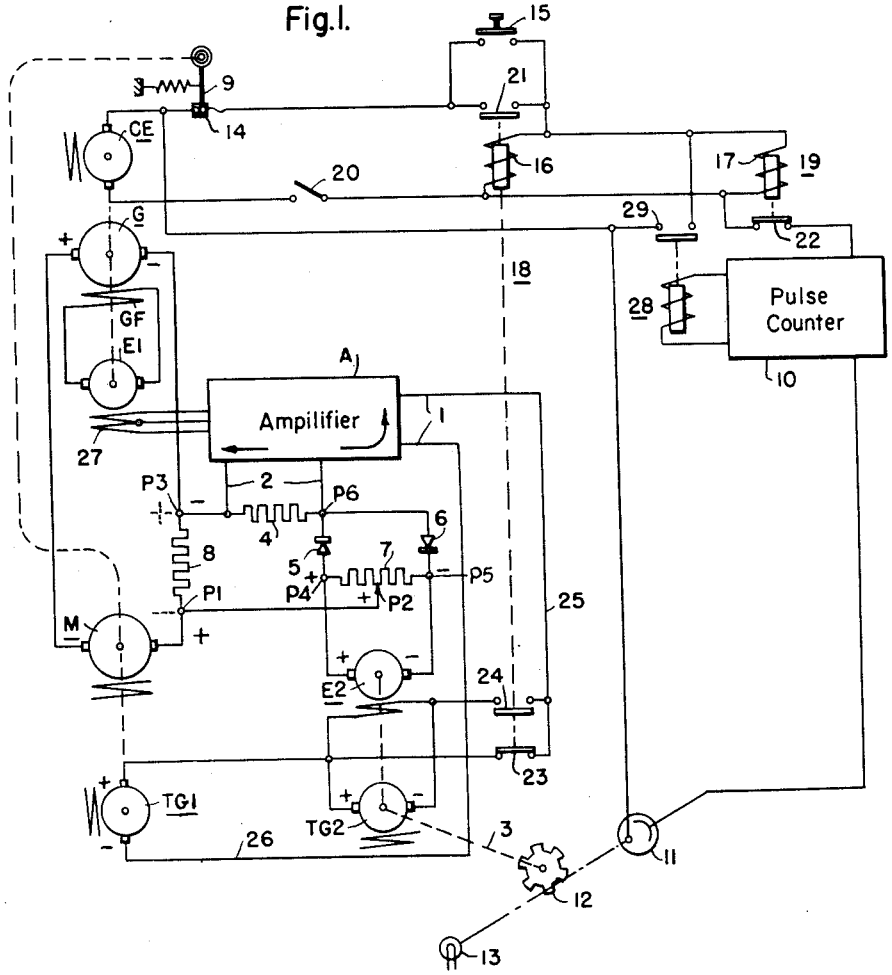
Figure 1 shows, by way of example, a circuit diagram for the control of the flying shear motor which is being supplied with electric energy on the Ward-Leonard principle.

Before describing our invention in detail by reference to the drawing, a few remarks outlining our invention in general terms may be most helpful to a better understanding of our invention.

According to a further feature of our invention, as shown in Fig. 1, acceleration of the flying shear, after the passage of a predetermined length of billet, is initiated by a counting device arranged to count increments of billet lengths as they pass a given point and to initiate acceleration after a predetermined number of increments have been counted.

The counting device may operate for example on the principle used in Geiger counters and is preferably arranged to count first in twos, then in twelves, and finally in tens to give inches and feet of billet cut length, assuming that counting is in half-inches.

Our invention is, however, not limited to apparatus responsive to a counting mechanism measuring increments of billet length passing a given point on the mill stand. We may selectively utilize photo-electric means, as shown in Fig. 3, or mechanical means, as shown in Fig. 4, for effecting cropping of the billets, and for effecting the cutting of the billets in selected lengths.

The maintenance of synchronous speed may be obtained by comparing a voltage dependent on the speed of the flying shear and a voltage dependent on the linear speed of the billet and varying the excitation of a generator supplying the motor in a corrective sense in accordance with any difference between the two voltages. The rate of acceleration may be controlled by comparing a voltage dependent on motor load current with a voltage dependent on the square of the billet speed and utilizing the difference to hold the load current at a predetermined value.

Referring now to Fig. 1, the flying shear (not shown) is driven by a separately excited motor M supplied from a variable voltage generator G, the generator being mechanically directed coupled to exciters CE and EI and driven from a substantially constant speed motor (not shown).

The generator field winding GF is separately excited from the exciter EI which is in turn separately excited from an electronic amplifier generally indicated at A and having two input circuits 1 and 2. The input circuit 1 is supplied from two tachometer generators TG1 and TG2 driven from the motor M and from the last mill stand, respectively, represented by shaft 3, and producing opposing outputs dependent on the speed of the flying shear and the speed of the billet as it leaves the last mill stand. The electronic amplifier A is arranged during cutting to vary the excitation of the exciter E1 and thus the speed of the motor M in accordance with the difference between the outputs of the two tachometer generators in a sense to reduce this difference.

The input circuit 2 is supplied in accordance with the voltage drop across a resistor 4 and, in combination with the input circuit 1, functions to control the rate of acceleration and deceleration of the motor M in accordance with the square of the billet speed. For this purpose the resistor 4 is connected through reversely connected rectifiers 5 and 6 and a center tapped resistor 7 across a series resistor 8 in the armature circuit of the motor M. Resistor 7 is supplied from an exciter E2 driven from the last mill stand and separately excited from the tachometer generator TG2. Since both the exciter E2 and the tachometer generator TG2 are driven from the last mill stand and the exciter E2 is excited in proportion to the voltage output of the tachometer generator TG2, namely, in proportion to the speed of the last mill stand, it will be evident that the voltage applied to the resistor 7 will vary in accordance with the square of the billet speed.

The mechanism controlling the sequence of motor operations comprises a limit switch 9 driven by the motor M and counting mechanism generally indicated at 10 and arranged to count the impulses supplied thereto from a photo-electric cell 11 associated with a toothed wheel 12, driven from the last mill stand, and a source of light 13. The toothed wheel is arranged to allow light to fall on the photo-electric cell every half-inch of billet as it passes through the last mill stand so that an impulse is transmitted to the mechanism 10 for each half-inch of the billet moving from the last mill stand.

Assuming that the mill stands are in operation and that the generator G is running at constant speed and that the manually operable switch, or circuit breaker 20, is in the closed position, the equipment is started by pressing the starting push button 15. This operation establishes a circuit from the upper terminal of the exciter CE through the contacts 14 of the limit switch 9, the contacts of the push button switch 15, the actuating coils 16 and 17, connected in parallel, of the relays 18 and 19, and circuit breaker 20, to the lower terminal of exciter CE. The energization of the relays 18 and 19 results in the closure of contacts 21 and the opening of contacts 22. The closure of contact 21 completes a holding circuit for both the relays 18 and 19, whereas, the opening of contacts 22 disconnects the counting device 10 from the photo-electric cell 11.

The operation of relay 18 also effects the opening of contacts 23, and the closing of contacts 24. The closing of contacts 24 connects the two tachometer generators TG1 and TG2 to the input circuit 1 of the electronic amplifier 10. It will be noted that the tachometer generators are connected in opposing relation. The circuit may be traced from the upper, or positive, terminal of the tachometer generator TG1 through the tachometer generator TG2 from the positive terminal to the negative terminal, contacts 24, conductor 25, the electronic amplifier A, conductor 26, to the negative terminal of the tachometer generator TG1.

Just prior to the initiation of the starting operation the motor speed of the main motor M is zero. The output of the tachometer generator TG1 is thus zero. When the push button 15 is depressed at time $t_1$, the main motor operates at zero speed from time $t_1$ to time $t_2$. We shall consider time $t_2$ that instant at which contacts 24 close. Under these conditions the output voltage of tachometer generator TG1 will be zero but the output voltage of tachometer generator TG2 will be at some value dependent on the billet speed so that a maximum voltage will be applied to the input circuit 1 of the electronic amplifier A. A maximum current will thus flow in field winding 27 of the exciter E1. The field GF of the generator G will thus be heavily excited and the motor M will thus start up and accelerate from zero speed to synchronous speed from time $t_2$ to $t_3$. (See Fig. 2.) Since the motor will draw a heavy accelerating current, or load current, a voltage will thus appear across the resistor 8 which opposes the voltage proportional to the square of the billet speed applied to the resistor 7.

To more clearly understand the function and coaction of the elements A, E2, 4, 5, 6, 7 and 8, reference may be had to the polarity indicated at the exciter terminals of exciter E2, and the polarity in full line indicated at the terminals of the resistor 8. The full line polarity indicated at the terminals of resistor 8 is the polarity present during acceleration of motor M.

For any given mill speed the voltage obtained from E2 will be constant and of the polarity indicated. The effect of the circuit comprising resistance 8, resistance 7, the rectifiers 5 and 6 and the resistance 4 is more fully described as below.

When P3 is less positive with respect to P1 than P5 is positive with respect to P2, no current will flow through the resistance 4, since the passage of a current from P5 to P3 is prevented by the rectifier 6. When P3 is less negative with respect to P1, then P4 is negative with respect to P2, no current will pass through the resistance 4, since its passage is prevented by the rectifier 5.

When acceleration starts, the contact 24 of relay 18 is closed and the speed control operates via input 1 to the electronic amplifier and thence by field 27, E1 and G the control attempts to accelerate the motor M as quickly as possible. This eventually brings the voltage on TG1 to near equality of that of TG2 so squaring the necessary small input for the electronic amplifier. In so doing, however, the motor armature current rises to a value at which P3 becomes more positive with respect to P1 than P5 is with respect to P2. This causes a current to pass through resistance 4 from P3 to P6 via 6, the right-hand side of resistance 7, P2 and back to P1.

The electronic amplifier is so arranged that this polarity across input 2 gives a current limiting effect opposing the speed input 1 and controlling the acceleration current to a value which corresponds very closely to maintaining voltage P1—P3 equal to P2—P5. The output of the electronic amplifier, therefore, rises as the motor accelerates and the motor speed/time curve is substantially a straight line with a slope dependent on the square of the billet speed.

Let the "synchronous" speed of the knives cutting edges in the direction of billet travel be "$v$" feet per second and the corresponding linear acceleration be $\alpha$ feet per second $^2$:

By the arrangement of the control $\alpha = kv^2$ where $k$ is a constant.

The acceleration time $$(t_3 - t_2) = \frac{v}{\alpha} = \frac{v}{kv^2} = \frac{1}{kv}$$

The length of billet passing the knives during acceleration say $L_0$ is therefore $$v \times (t_3 - t_2) = \frac{v}{1/kv} = L_0 = k, \text{ a constant}$$

Since the total time elapsing between cuts is equal to $(t_6 - t_4) + (t_8 - t_6) + (t_9 - t_8) + (t_{10} - t_9)$ and the length cut is equal to this total time multiplied by $v$, $$(t_6 - t_4) + (t_{10} - t_9) = (t_6 - t_4) + (t_4 - t_3)$$

= time the shear runs at substantially synchronous speed and corresponds to a fixed angular movement of the shear knives.

It follows that this total time is inversely proportional to "$v$" and that the length of billet passing through the shear during this period say $L_1$ is a constant amount.

$t_3 - t_2$ is the acceleration time and, as already shown, this corresponds to a length of $L_0$ passing through the shear.

$t_8 - t_6$ is the interval covered by the counter and corresponds say to a length $L_2$ which is measured out by the counter.

It follows that the cut length is equal to $L_0 + L_1 + L_2$, and, since $(L_0 + L_1)$ remains constant irrespective of speed the setting device for the counter can readily make allowance for this as a zero shift and the counter can be graduated directly in feet and inches and these graduations are not affected by change in the speed of the billet.

It will be noted that the cut length is independent of the deceleration time but there is some advantage in using deceleration proportional to square of linear speed of billet. This ensures that the angle travelled by the shear knives in deceleration is constant irrespective of speed. This ensures that the acceleration and deceleration rates are always at the minimum possible value consistent with satisfactory operation and so minimizes the wear on gears and other mechanical parts.

The deceleration control operates when the electronic amplifier input is changed by relay 18 and the input 1 to the amplifier consists of TG1 voltage alone connected in the direction to decrease speed. This tends to cause an excessive deceleration current which makes P3 more negative with respect to P1 than P4 is with respect to P2. A current therefore flows through P1, P2, right-hand side of 7, P4, 5 and P6 to P3. This gives the reverse polarity of input 2 which tends to maintain the generator voltage and so limit the deceleration current to the desired value so that the voltage across P1 to P3 is very nearly equal to P2—P4.

In fact, the accelerating period is measured by the difference between $t_3$ and $t_2$ and the speed change from zero speed to synchronous speed is indicated by the sloping straight line proceeding upwardly from point $t_2$. An instant after $t_3$, as at $t_4$, when the motor speed is certain to have stabilized at synchronous speed, the cutting operation begins and is completed at $t_5$. At the moment, as $t_6$ when the shear knives are clear of the billet, the limit switch 9 opens the contacts 14, whereupon both the relays 18 and 19 are deenergized. Contacts 24 are thus opened and contacts 23 closed. Since the tachometer generator TG2 is removed from the input circuit 1, the voltage of generator G is reversed. The motor M thus decelerates to standstill from synchronous speed at $t_6$ to zero speed at $t_7$. The rate of deceleration is now controlled by the input circuit 2 to the electronic amplifier A in a manner similar to the acceleration control.

Deenergization of relay 19 results in the closing of contacts 22 whereby the counting device 10 is interconnected with the photo-electric cell 11 and the exciter CE. The counting device now begins to count the number of half-inches of billet length passing a given point.

Figure 2:
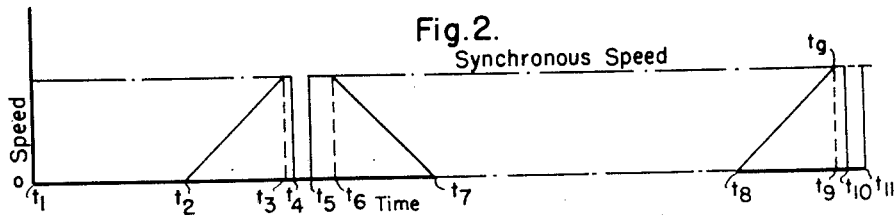
Fig. 2 shows the relationship between the speed of the flying shear and time during the operation of cutting the billet to a selected length.

After a predetermined number of half-inches have been counted, the device 10 energizes the relay 28 which closes its contacts 29 to re-complete the circuit to the relays 18 and 19 thereby initiating re-acceleration of the motor M at the point $t_8$ in Fig. 2 to make the next cut, the contacts 14 of the limit switch 9 having been reclosed when the motor reaches standstill.

Acceleration proceeds from $t_8$ to synchronous speed in the period from $t_8$ to $t_9$. In fact the cycle is complete from $t_1$ to $t_8$. In each succeeding cycle the times correspond to the preceding cycle, as $t_8$, $t_9$, $t_{10}$, $t_{11}$, etc., correspond to $t_2$, $t_3$, $t_4$ and $t_5$, etc.

It will be seen that during acceleration of the flying shear knives of the shear move through a fixed angle so that, since the acceleration is constant, a fixed length of billet will pass a given point during the accelerating period. A further fixed length of billet will then pass this point while the knives are running at constant speed to effect the cut and therefore, these two lengths being constant, it is only necessary to vary the number of increments counted by the device 10 before the motor is again accelerated from standstill to vary the length of billet cut.

The limit switch 9 may, if desired, be replaced by a single toothed wheel directly coupled to the crank operating the shear knives and arranged to cut a beam of light directed on to a photoelectric cell during the period over which it is desired to maintain open the contacts 14 in circuit with the relays 18 and 19.

Where, as in the present example, the deceleration of the motor M is controlled in accordance with a given law, measurement of billet length may be started from any point in the running cycle. If, on the other hand, the deceleration is not controlled, the measurment should commence before deceleration begins. It may, for example, commence at the start of the acceleration period.

In Fig. 3 the same reference characters are used for the same elements shown in Fig. 1.

The mechanisms for controlling the sequence of motor operations of the apparatus shown in Fig. 3 comprises the limit switch 109 driven by the motor M and the photo-electric billet measuring apparatus generally indicated at 110.

Let the assumption be that the mill stands are in operation, with MS representing the last mill stand and FS representing the flying shear, that the generator G is running at constant speed, that the manually operable switch, or circuit breaker 20, is in closed position, that the exciters E1 and E2 are in operation, and that the tachometer generator TG2 is in operation. That generator TG2 will be in operation is apparent from the fact that this generator is driven from the shaft 3 of the last mill stand.

The control operation is started by the billet itself. As the front end of the billet passes between the lamp 113 and the photocell 111 to intercept the beam of light shown, an energizing circuit is established for the coil 136 from the source S and in consequence the contacts 136a and 236b are closed.

The closure of contacts 136a establishes a circuit from the upper terminal of the exciter CE through the contacts 136a, 138a, 139a, the normally closed contact 114 of the limit switch 109, the actuating coil 137 of the contactor 118, the lead 119 and switch 20 to the lower terminal of the exciter CE.

The operation of the contactor 118 results in the closure of contacts 124, 137a, 137b and the opening of the contacts 123. The closure of contacts 137a completes a holding circuit for coil 137. This circuit may be traced from the energized lead 150 through contacts 137a, and lead 151 to the limit switch 114. The energization of coil 137 is thus made independent of the operation of relay 140.

The closure of contacts 137b establishes a circuit from lead 150 through the contacts 137b, and the actuating coil 139 of the relay 140. The relay 140 closes its contacts 139b to hold itself in and opens its contacts 139a. The energization of coils 137 and 139 and thus the disposition of all the contacts controlled by these coils is now dependent on the position of contacts 114 of the limit switch 109.

The closure of contacts 124 and the opening of contacts 123 effects the same operation as is effected by the corresponding operation of contacts 24 and 23 shown in Fig. 1. This means the motor M goes through its cycle of operation to cut the billet.

The disposition of the photocell unit 161 is preferably so selected that the flying shear FS merely crops the front end of the billet. The unit 161 is mounted for independent adjustment on the adjustable slider 159. The photocell unit 158 is also disposed for independent adjustment on the adjustable slider 159. The slider in practice is provided with graduations in feet, inches, and half inches. By suitable adjustment of the units 161 and 158 with respect to each other and the flying shear FS, any selected length of billet may be cut. This will become more apparent as the description proceeds.

As soon as the first cut, which may be the cropping cut is made and the knives are clear of the billet the contacts 114 open to thus deenergize the coils 137 and in consequence the contacts 123 close and the contacts 124 open. The tachometer generators TG1 and TG2 are thus disconnected from the amplifier A. The motor thus decelerates to standstill in the manner discussed in connection with the description of Fig. 1.

During the deceleration the contacts 114 reclose first and then the contacts 214 close momentarily. The closing of the contacts 114 at this stage does not effect reenergization of coil 137 because the contacts 139a are still open.

The closure of contacts 214 establishes a circuit from the exciter CE through contacts 136b, the limit switch contacts 214, the actuating coil 138 of relay 141, and switch 20 to the lower terminal of the exciter CE. The operation of relay 141 opens the contacts 138a to deenergize the coil 139 of relay 140, and closes the contacts 138b to provide a holding circuit for coil 138 through contacts 136b and 138b. Conditions are now so set that the control is ready for a second cycle of operation, but for the second cycle of operation the signal now has to come from the photocell unit 158.

When a selected length of billet has passed through the machine the front end of the billet intercepts the beam of light passing from lamp 162 to the photocell 163. The actuating coil 170 is energized with the result that contacts 171 are closed to energize the coil 137. A second cycle of motor operation is now effected.

If contacts 136a open before contacts 171 close, then there is not sufficient length of material at the tail end of the material to cut a billet of the required length.

In Fig. 4, the switch units 261 and 258 correspond to the photocell units 161 and 158. The operation of the switches 236 and 271 corresponds to the operation of the switches 136a and 171. The units 261 and 258 are adjustable similarly to the adjustment of the units 161 and 158 so that billets of different lengths may be cut.

While we have shown and described but a single embodiment of our invention, we are not to be limited to such single embodiment, but our invention includes all such modifications and embodiments as fall within the scope of the claims hereto appended.

What we claim is:

1. In a system of control for an electric motor, in combination, a direct current motor having a field winding excited at a selected value, a direct current generator operated at a selected speed, having its armature connected in a loop circuit with the armature winding of the motor, a tachometer generator mechanically coupled to the motor to thus produce a voltage output proportional to the motor speed, a second tachometer generator operated from a suitable driving shaft to thus produce a voltage output proportional to its operating speed, an exciter coupled to be driven at the same speed as the second tachometer generator, said exciter having a field winding connected to the second tachometer generator, whereby the exciter has an output voltage proportional to the square of the speed of the second tachometer generator, control means for producing a voltage as a function of the motor load current, circuit means interconnecting the last named means and the exciter to produce an excitation effect on the generator as a function of the difference between the voltage effect of the control means and the voltage of the exciter, second circuit means interconnecting said two tachometer generators to also produce an excitation effect on the generator that is a function of the difference of the voltages of the tachometer generators.

2. In a system of control, in combination, a motor, the operation of which is to be controlled, said motor having field windings excited at a selected value and having armature windings, means for producing a voltage that is a function of the motor load current, means for producing a voltage that is a function of the motor speed, speed responsive means for producing a voltage proportional to the speed of a machine shaft, squared speed responsive means for producing a voltage proportional to the square of the speed of the mentioned machine shaft, and electric circuit means interconnecting the four voltage producing means mentioned and the armature windings to produce a voltage on the motor armature windings that is a function of the algrebraic sum of the voltages of the said four mentioned means.

3. In an electric system of control, in combination, a pair of electric terminals, a load unit connected to said terminals, means for producing a voltage proportional to the speed of a rotating shaft, means for producing a voltage proportional to the square of the speed of said rotating shaft, control means for producing a voltage proportional to an operating characteristic of said load unit, current responsive means for producing a voltage proportional to the load current of said load unit, control circuit means interconnecting the preceding means and the means for producing a voltage proportional to the square of the speed of said rotating shaft, to produce a control voltage proportional to the difference between a selected speed-squared voltage and a voltage of said current responsive means greater than said selected speed-squared voltage, second control circuit interconnecting said control means and said means for producing a voltage proportional to the speed of said machine shaft to produce a second control voltage proportional to the difference between the voltage producing means connected to this second control circuit means, and amplifying circuit means responsive to the difference of said two control voltages for producing an amplified voltage effect on said pair of electric terminals.

4. In a system of control for an electric motor, in combination, a direct current motor having a field winding excited at a selected value and having an armature winding and voltage supply circuit therefor, an armature driving shaft, a first tachometer generator driven by said shaft to thus produce a voltage proportional to the shaft speed, a second tachometer generator mechanically coupled to the motor armature to thus produce a voltage proportional to the motor speed, an exciter interconnected electrically and mechanically with the first tachometer generator to produce a voltage proportional to the square of the speed of said shaft, control means for producing a voltage proportional to the motor load current, control circuit means interconnecting the exciter and the control means and adapted to produce a voltage proportional to the difference between the exciter voltage and a voltage of said control means greater only than the exciter voltage, second control circuit means interconnecting the tachometer generators and adapted to produce a voltage proportional to the difference between the tachometer generators, and third control circuit means for varying the voltage of said supply circuit as a function of the difference of the voltages produced by the first and second control circuit means.

5. In a system of control for an electric motor, in combination, a direct current motor having a field winding excited at a selected value and having an armature winding and voltage supply circuit therefor, an armature driving shaft, a first tachometer generator driven by said shaft to thus produce a voltage proportional to the shaft speed, a second tachometer generator mechanically coupled to the motor armature to thus produced a voltage proportional to the motor speed, an exciter interconnected electrically and mechanically with the first tachometer generator to produce a voltage proportional to the square of the speed of said shaft, control means for producing a voltage proportional to the motor load current, control circuit means interconnecting the exciter and the control means and adapted to produce a voltage proportional to the difference between the exciter voltage and a voltage of said control means greater only than the exciter voltage, electromagnetic means for connecting the two tachometer generators in opposition at an instant when the voltage on said supply circuit is zero, amplifying control circuit means responsive to the differential voltage of the tachometers and the voltage of the control circuit means, and interconnected with the voltage supply circuit, whereby the voltage of said supply circuit is caused to be a function of the difference between the decreasing voltage of the voltage difference between the tachometers as the motor speed changes from zero speed to a selected higher speed and decreasing voltage of the control circuit means as the motor load current decreases.

6. In a system of control for an electric motor, in combination, a direct current motor having a field winding excited at a selected value and having an armature winding and voltage supply circuit therefor, an armature driving shaft, a first tachometer generator driven by said shaft to thus produce a voltage proportional to the shaft speed, a second tachometer generator mechanically coupled to the motor armature to thus produce a voltage proportional to the motor speed, an exciter interconnected electrically and mechanically with the first tachometer generator to produce a voltage proportional to the square of the speed of said shaft, control means for producing a voltage proportional to the motor load current, control circuit means interconnecting the exciter and the control means and adapted to produce a voltage proportional to the difference between the exciter voltage and a voltage of said control means greater only than the exciter voltage, electromagnetic means for connecting the two tachometer generators in opposition at an instant when the voltage on said supply circuit is zero, amplifying control circuit means responsive to the differential voltage of the tachometers and the voltage of the control circuit means, and interconnected with the voltage supply circuit, whereby the voltage of said supply circuit is caused to be a function of the difference between the decreasing voltage of the voltage difference between the tachometers as the motor speed changes from zero speed to a selected higher speed and decreasing voltage of the control circuit means as the motor load current decreases, means operable after a selected angular rotation of the motor for disconnecting the second tachometer generator from the amplifying control circuit means, whereby the voltage of said supply circuit is caused to be a function of the voltage, the second tachometer and the said control circuit means to thus decrease the motor speed to zero.

7. In a system of control for an electric motor, in combination, a direct current motor having a field winding excited at a selected value and having an armature winding and voltage supply circuit therefor, an armature driving shaft, a first tachometer generator driven by said shaft to thus produce a voltage proportional to the shaft speed, a second tachometer generator mechanically coupled to the motor armature to thus produce a voltage proportional to the motor speed, an exciter interconnected electrically and mechanically with the first tachometer generator to produce a voltage proportional to the square of the speed of said shaft, control means for producing a voltage proportional to the motor load current, control circuit means interconnecting the exciter and the control means and adapted to produce a voltage proportional to the difference between the exciter voltage and a voltage of said control means greater only than the exciter voltage, electromagnetic means for connecting the two tachometer generators in opposition at an instant when the voltage on said supply circuit is zero, amplifying control circuit means responsive to the differential voltage of the tachometers and the voltage of the control circuit means, and interconnected with the voltage supply circuit, whereby the voltage of said supply circuit is caused to be a function of the difference between the decreasing voltage of the voltage difference between the tachometers as the motor speed changes from zero speed to a selected higher speed and decreasing voltage of the control circuit means as the motor load current decreases, means operable after a selected angular rotation of the motor for disconnecting the second tachometer generator from the amplifying control circuit means, whereby the voltage of said supply circuit is caused to be a function of the voltage, the second tachometer and the said control circuit means to thus decrease the motor speed to zero, and means responsive to a selected angular rotation of said shaft for energizing the said electromagnetic means to again connect the two tachometer generators in opposition at an instant when the voltage on the supply circuit is zero.

8. In an electric system of control, in combination, a direct current motor for operating a load, said motor having an armature winding and having a field winding excited at a selected substantially constant value, a direct current generator driven at a substantially constant speed from a suitable driving means, said generator having a field winding the excitation of which is to be controlled and having an armature winding connected in a loop circuit with the armature winding of the motor, generator excitation control circuits for controlling the generator field excitation in accordance with the voltage difference between two input voltages that may be supplied to said control circuits, a tachometer generator mechanically coupled to the motor to thus produce a voltage proportional to the speed of the motor, a voltage input circuit for the excitation control circuits, switching means having two operating positions, for so connecting the tachometer generator when in one of its operating positions, to the input circuit that the excitation control circuits reduce the generator excitation to zero, if at the time said switching means are operated the motor and tachometer are running, to thus stop the motor and tachometer generator, a second tachometer generator having its armature shaft driven at any one of any number of selected speeds to thus produce a voltage proportional to its shaft speed, means for operating said switching means to its second operating position to connect the second tachometer generator in opposition to the first tachometer in the input circuit, whereby the generator is excited to start and accelerate the motor and first tachometer generator to a selected motor speed at which the motor speed stabilizes dependent on the voltage differential between the two tachometers, an exciter producing a voltage proportional to the square of the speed of the second tachometer, control means for producing a voltage proportional to the motor load current, control circuit means interconnecting the exciter and the control means and adapted to produce a voltage proportional to the difference between the exciter voltage and a voltage of said control means greater than the exciter voltage, a second input circuit for the generator excitation control circuits connected to be supplied by the control circuit means to limit the generator excitation increase produced by the voltage supplied to the first input circuit, and means operable after a selected angular rotation of the motor after operation of the switching means to its second operating position for effecting the operation of the switching means to the first operating position to thereby effect the stopping of the motor.

9. In an electric system of control, in combination, a direct current motor for operating a load, said motor having an armature winding and having a field winding excited at a selected substantially constant value, a direct current generator driven at a substantially constant speed from a suitable driving means, said generator having a field winding the excitation of which is to be controlled and having an armature winding connected in a loop circuit with the armature winding of the motor, generator excitation control circuits for controlling the generator field excitation in accordance with the voltage difference between two input voltages that may be supplied to said control circuits, a tachometer generator mechanically coupled to the motor to thus produce a voltage proportional to the speed of the motor, a voltage input circuit for the excitation control circuits, switching means having two operating positions, for so connecting the tachometer generator when in one of the operating positions, to the input circuit that the excitation control circuits reduce the generator excitation to zero, if at the time said switching means are operated the motor and tachometer are running, to thus stop the motor and tachometer generator having its armature shaft driven at any one of any number of selected speeds to thus produce a voltage proportional to its shaft speed, means for operating said switching means to its second operating position to connect the second tachometer generator in opposition to the first tachometer in the input circuit, whereby the generator is excited to start and accelerate the motor and first tachometer generator to a selector motor speed at which the motor speed stabilizes dependent on the voltage differential between the two tachometers, an exciter producing a voltage proportional to the square of the speed of the second tachometer, control means for producing a voltage proportional to the motor load current, control circuit means interconnecting the exciter and the control means and adapted to produce a voltage proportional to the difference between the exciter voltage and a voltage of said control means greater than the exciter voltage, a second input circuit for the generator excitation control circuits connected to be supplied by the control circuit means to limit the generator excitation increase produced by the voltage supplied to the first input circuit, means operable after a selected angular rotation of the motor after operation of the switching means to its second operating position for effecting the operation of the switching means to the first operating position to thereby effect the stopping of the motor, and means responsive to a selected angular rotation of the second tachometer armature shaft for effecting the operation of said switching means to its first operating position to restart and accelerate the motor from rest to said selected stabilized motor speed.

10. In a system of control, in combination, an electric circuit the energization of which is to be controlled, a load circuit carrying a load current, load current responsive means for producing a voltage that varies in the same sense as the variations in load current, a first generator for producing a voltage proportional to its speed, a second generator for producing a voltage proportional to its speed, a third generator coupled to operate at the same speed as the second generator and electrically connected to said second generator to thus be excited as a function of the voltage of the second generator, whereby the voltage output of the third generator is a function of the square of the speed of the third generator, and a mixing circuit for the outputs of the three generators and the load current responsive means for producing a voltage on said electric circuit to be controlled that is a function of the algebraic sum of the four voltages produced by the load current responsive means and the three generators.

11. In a system of control, in combination, an electric circuit the energization of which is to be controlled, a load circuit carrying a load current, load current responsive means for producing a voltage that varies in the same sense as the variations in load current, a first generator for producing a voltage proportional to its speed, a second generator for producing a voltage proportional to its speed, a mixing circuit for said generators for producing a voltage that is a function of the difference in voltage of said first and second generators, a third generator coupled to operate at the same speed as the second generator and electrically connected to said second generator to thus be excited as a function of the voltage of the second generator, whereby the voltage output of the third generator is a function of the square of the speed of the third generator, a second mixing circuit for said third generator and the load current responsive means for producing a voltage that is a function of the difference of the voltages of the third generator and the load current responsive means, and a third mixing circuit for mixing the output voltages of the first and second mixing circuits to produce a voltage output on the circuit to be controlled that is a function of the difference between the voltages supplied to the third mixing circuit.

12. In a system of control, in combination, a motor the operation of which is to be controlled, said motor having field windings excited at any selected value and having armature windings, first means for producing a voltage that is a function of the motor speed, second means for producing a voltage that is a function of the speed of a machine shaft, third means for producing a voltage that is a function of the square of the speed of the machine shaft, fourth means for producing a voltage that is a function of the motor armature current, and electric circuit means interconnecting said four means and the motor armature windings for producing a voltage on the motor armature windings that is a function of the voltages of said four means.

13. In a system of control, in combination, a motor the operation of which is to be controlled, said motor having field windings excited at any selected value and having armature windings, first means for producing a voltage that is a function of the motor speed, second means for producing a voltage that is a function of the speed of a machine shaft, first mixing circuit means, interconnecting said first and second voltage producing means, for producing a voltage that is a function of the difference between the voltages produced by the first and second means, third means for producing a voltage that is a function of the square of the speed of the machine shaft, fourth means for producing a voltage that is a function of the motor armature current, second mixing circuit means interconnecting said third and fourth means for producing a voltage that is a function of the difference of the voltages produced by the third and fourth means, and electric circuit means interconnecting said first and second mixing circuit means and the motor armature windings for producing a voltage on the motor armature windings that is a function of the difference of the voltages of said first and second mixing circuit means.

References Cited in the file of this patent

UNITED STATES PATENTS

| Number | Name | Date |
|---|---|---|
| 2,546,024 | Wrathall | Mar. 20, 1951 |
| 2,634,811 | Schaelchlin | Apr. 14, 1953 |
| 2,655,994 | Vandenberg | Oct. 20, 1953 |